United States Patent [19]
Appleby

[11] Patent Number: 4,718,454
[45] Date of Patent: Jan. 12, 1988

[54] VALVE OPERATING SYSTEM

[75] Inventor: William Appleby, Gosforth, England

[73] Assignee: British Gas Plc, London, England

[21] Appl. No.: 919,867

[22] Filed: Oct. 17, 1986

[30] Foreign Application Priority Data

Nov. 20, 1985 [GB] United Kingdom ............... 8528528

[51] Int. Cl.⁴ .............................................. F16K 31/02
[52] U.S. Cl. ................... 137/624.11; 361/156;
361/167; 137/625.64; 137/625.65
[58] Field of Search ............... 137/624.11, 624.13,
137/624.15, 625.64, 625.65; 361/156, 167, 170

[56] References Cited

U.S. PATENT DOCUMENTS

| | | | |
|---|---|---|---|
| 3,200,591 | 8/1965 | Ray | 60/52 |
| 3,203,447 | 8/1965 | Bremner et al. | 137/595 |
| 3,547,154 | 12/1970 | Benham | 137/624.11 |
| 3,975,666 | 8/1976 | Redding | 361/156 |
| 4,245,671 | 1/1981 | Kosugui | 137/625.64 |
| 4,253,493 | 3/1981 | English | 137/625.65 |
| 4,304,989 | 12/1981 | Vos et al. | 235/92 CT |
| 4,527,216 | 7/1985 | Stammely | 361/156 |
| 4,533,972 | 8/1985 | Obashi | 361/156 |
| 4,534,539 | 8/1985 | Dettmann | 251/65 |
| 4,538,129 | 8/1985 | Fisher | 137/625.65 |

FOREIGN PATENT DOCUMENTS

| | | |
|---|---|---|
| 101527 | 2/1984 | European Pat. Off. |
| 8413850 | 5/1984 | Fed. Rep. of Germany |
| 2123595 | 2/1984 | United Kingdom |
| 2138967 | 10/1984 | United Kingdom |

Primary Examiner—Alan Cohan
Attorney, Agent, or Firm—Larson and Taylor

[57] ABSTRACT

The system is particularly suitable for controlling a solenoid valve SV1 having two stable operating positions in accordance with programmed 'on' and 'off' periods set at a 24 hour timer 10. The valve typically in one position connects a gas supply to a regulator ensuring the latter then supplies gas at a higher pressure; and in the other position connects the regulator to atmosphere through a vent stack so that the regulator then supplies gas at a lower pressure. The system is powered by 3 volt batteries B1, B2 and has extremely lower current consumption giving a battery life of 5-6 years. The solenoid 18 is energised briefly by voltage pulses fed from a capacitor C5 via a reversing switch 16. Automatic battery voltage checking is incorporated.

9 Claims, 7 Drawing Figures

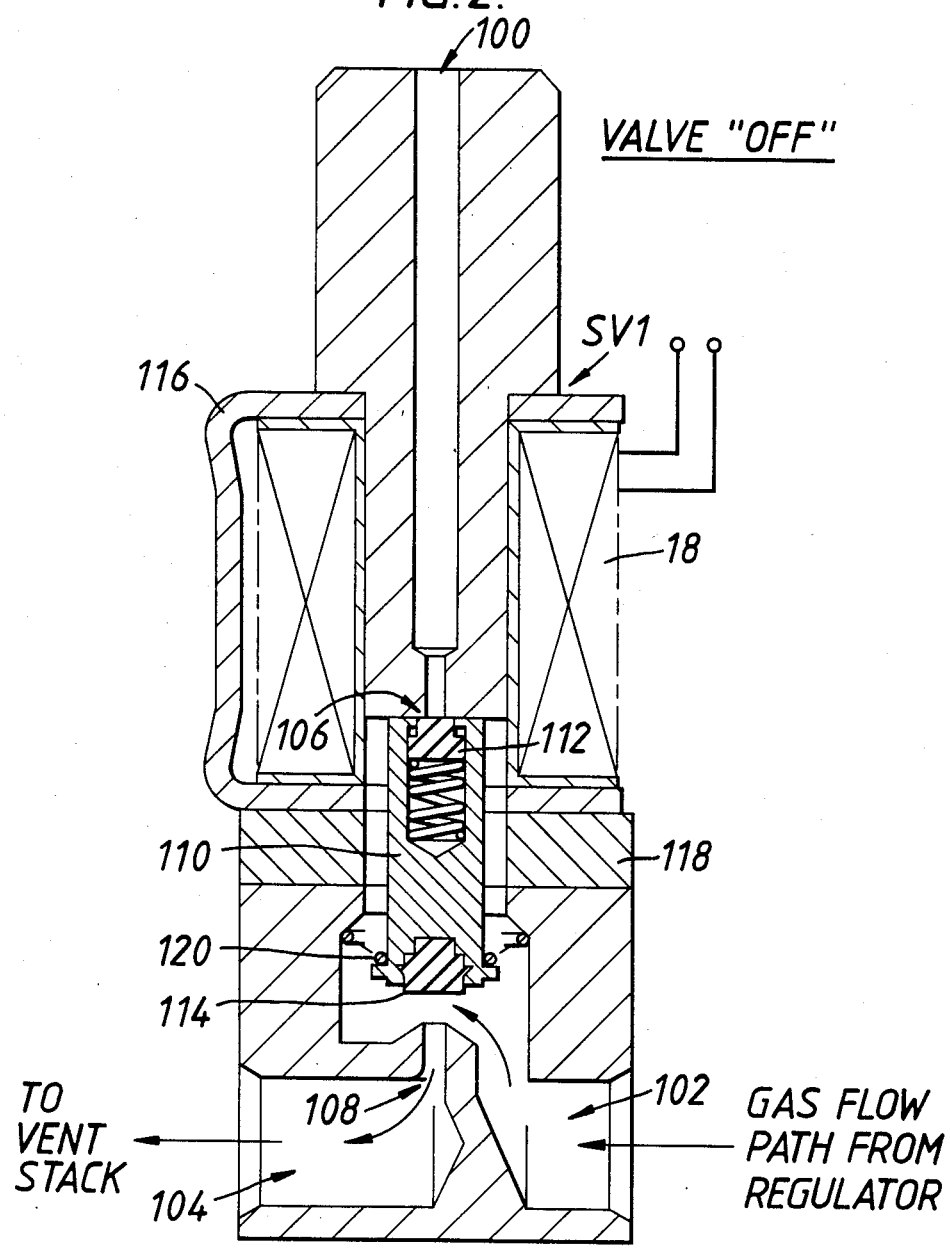

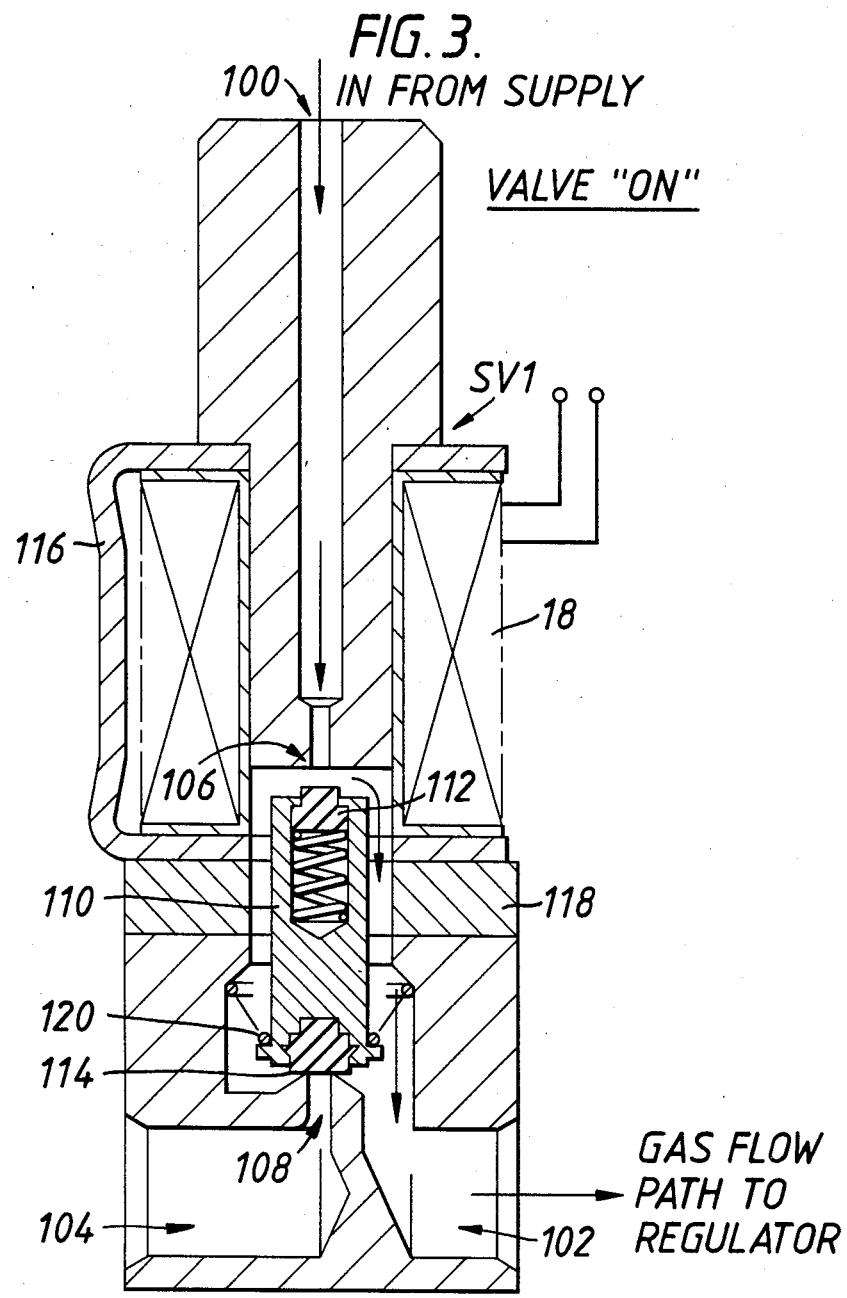

VALVE OPERATING SYSTEM

The invention relates to valve operating systems, particularly though not exclusively to systems applicable to natural gas distribution installations.

For example, in natural gas distribution installations pressure regulators are provided which feed gas at the final pressure reduction stage to consumers. The regulator output pressure is switched between two preset levels at times of day based on known consumer demand. The pressure level being higher when demand is at a higher level and the pressure level being lower when demand is lower. The existing method of switching the regulator level is by means of a clockwork-driven timer, which actuates a small poppet valve through a lever or cam assembly. Such a timer must be re-wound manually every fortnight.

The object of the invention is to provide a valve operating system which avoids the need for a clockwork timer.

A valve operating system, according to the invention, comprises battery means powering said system, a bistable valve means operable by at least one solenoid, a capacitor connectable by semiconductor switch means to the solenoid to discharge through the solenoid during its 'on' periods and which is maintained charged during its 'off' periods, a drive circuit controlling the switch means by voltage pulses, a control module providing a liquid crystal display of real time and allowing selection of operating times of the valve means by manually operable elements said drive circuit deriving the pulses from the output of the module, the system, excepting the solenoid during its 'off' periods, being continuously powered by the battery means but the current consumption of the drive circuit during said 'off' periods being substantially zero, and said system further comprising battery voltage check circuit means for, responsive to a fall in the voltage of said battery means below a predetermined level, inhibiting the operation of said drive circuit to drive said switch means to one of its two conditions.

Preferably, the valve means comprises a single solenoid and an armature movable to move a valve member relative to valve ports.

Alternatively, the valve means comprises a spool valve member which, in one form, may be movable by fluid pressure relative to valve ports under the control of solenoid valves; or alternatively the spool valve member is movable relative to valve ports by two solenoids acting alternately.

Preferably, the valve member is movable between a first position in which a first valve port is connected to a second valve port and a third valve port is closed and a second position in which the second valve port is connected to the third valve port and the first valve port is closed.

A valve operating system will now be described as an embodiment of the invention by way of example with reference to the accompanying drawings, in which:

FIGS. 2 and 3 are schematic vertical sections through the valve means used in the system shown in FIG. 1.

Figure 1:
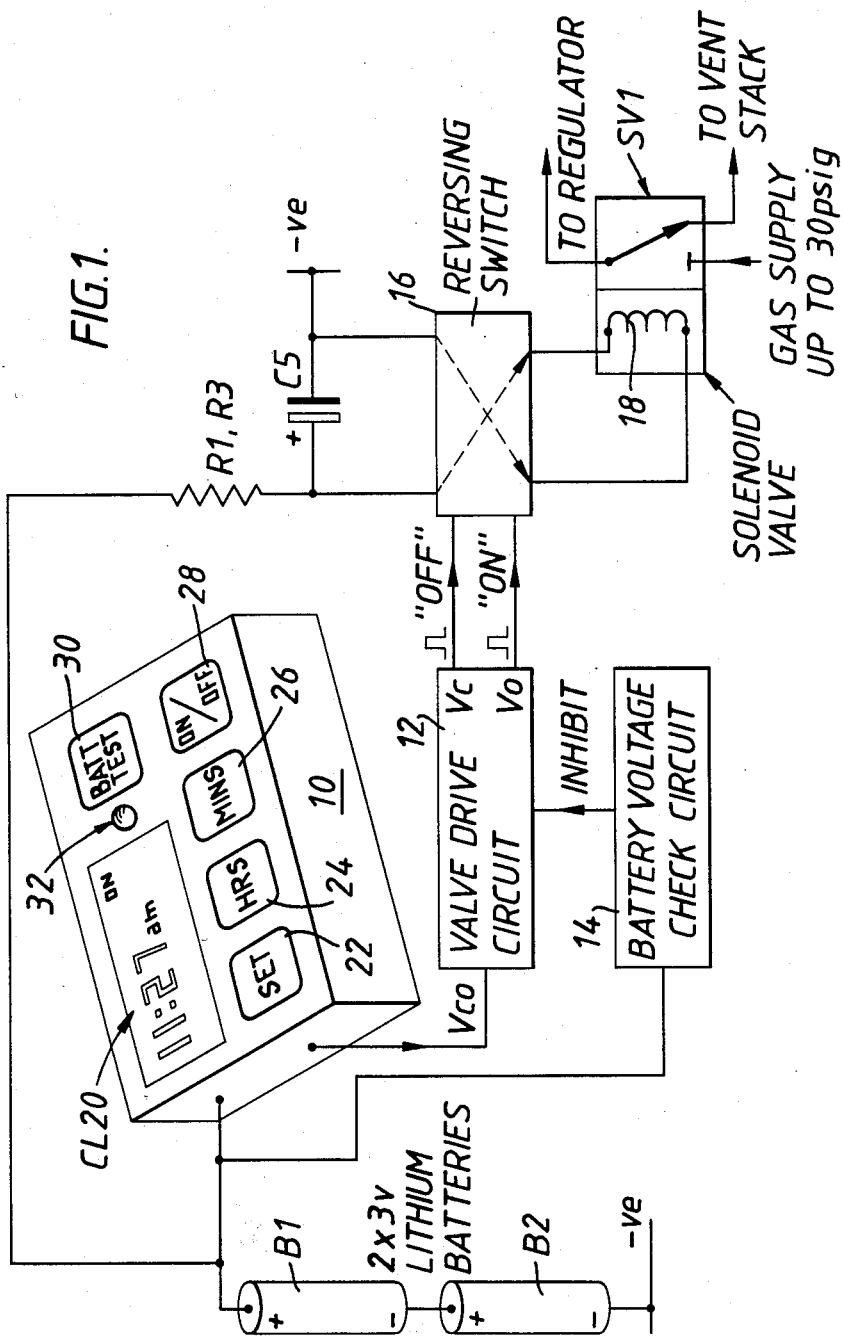
FIG. 1 is a schematic block diagram of the system as a whole showing the main components.

The system as shown in FIG. 1 consists of the following principal components: two lithium batteries, B1, B2 each of three volts output connected in series to suppy the electric circuitry of the system; a control module 10; electric circuitry including a drive circuit 12; a battery voltage check circuit 14; a capacitor C5; a resistor combination R1, R3 in series; a reversing switch 16; and a valve SV1 which includes a solenoid coil 18 connected to the switch 16.

The control module includes a 24-hour electronic timer clock CL20 having a liquid crystal display showing real time and the condition of the valve, whether "on" or "off". It also shows the set times at which the valve operates. The module also includes a membrane keyboard providing five manually-operable touch-keys 22, 24, 26, 28, 30 by which the times of operation of the valve can be set (22, 24, 26); by which the valve can be manually operated ("on"/"off", 28) and by which the battery can be tested, 30. On pressing the key 30, if the battery voltage B1, B2 is below the requisite minimum level, a red flashing light is emitted at a window 32 by a light-emitting diode 34 (FIG. 4). If the voltage level is above the level a green light is emitted by the l.e.d. 36.

Although FIG. 1 shows the components of the system as separated from the housing of the module 10 for the sake of explanation, the operating system, excluding the valve itself, is housed within the module casing which typically is very compact and measures, for example, 120 mm by 100 mm by 80 mm.

The electric circuitry imposes a very low current drain on the batteries and the valve is chosen so as to be operable by brief voltage pulses from the capacitor C5. The result is that the batteries have a long life of some 5 to 6 years. The valve operating time is typically, for example, only 10 milliseconds and six operations at the most occur per day with the system as described, which can be set to give a maximum of three 'on' times and three 'off' times per 24 hour period. The typical current consumption is, for example, during valve 'on' periods 23 micro-amperes and during 'off' periods 10 micro-amperes, at a steady state at 20 degrees Celsius.

Following a valve change-over operation, the capacitor C5 recharges quickly through R1, R3 from the batteries and the current consumption of the drive circuit 12 falls essentially to zero. Typically, for example, after 10 minutes the consumption is 5 micro-amperes.

The valve SV1 shown in FIGS. 2 and 3 is preferably of the kind available from Datron Systems Inc, Eemco division, Los Angeles USA under the designation Type 40.

It comprises a valve body providing first, second and third ports 100, 102, 104 respectively, and two internal valve openings 106, 108. An armature 110 forms a valve member and carries two rubber seal bodies 112, 114 at its ends. The bodies 112, 114 close against the valve openings 106, 108 respectively, in one or the other stable end position of the armature 110, which is movable vertically as seen in FIGS. 2 and 3.

The valve SV1 also comprises the solenoid coil 18, an associated magnetic yoke 116 and an annular magnet 118 surrounding the armature 110. When the arature 110 is in its upper position, the seal 112 closes against the opening 106 so that the first port 100 is effectively closed. The second port 102 is connected to the third port 104 (FIG. 2). When the armature is in its lower position (FIG. 3) the rubber seal 114 closes against the opening 108. The third port 104 is effectively closed and the first port 100 is connected to the second port 102.

In the case of application of the invention to a natural gas supply installation in which a regulator is provided as referred to above, the regulator would be connected between the port 102 and the consumer side of the installation. The gas supply side would be connected to the port 100. The port 104 would be connected to a vent stack of the installation.

The position of the valve shown in FIG. 2 corresponds to the lower demand level periods during each 24 hour period. The control side of the gas regulator is vented to atmosphere via the stack and the regulator supply side feeds a lower gas pressure to the consumer. The position shown in FIG. 3 corresponds to higher demand periods. The regulator control side is exposed to gas pressure via the path through the valve SV1 so that the regulator supplies gas to the consumer at a higher pressure. The valve SV1 essentially transmits pressure in this application, relatively little flow actually passing through the valve.

In the position shown in FIG. 2, the armature is held by the magnet 118 in its upper position after the capacitor C5 has discharged its pulse into the solenoid 18. In the position shown in FIG. 3, a pulse of opposite polarity from the capacitor C5, via the changed-over switch 16, has energised the solenoid to overcome the magnetic force. The armature descends and is held in its lower position by the coil compression spring 120. The valve SV1 is thus a bistable valve. The position shown in FIG. 2 is the 'off' position, ie lower demand condition and that in FIG. 3 is the 'on' position, ie higher demand condition.

Typically, for example, the gas supply is at a pressure up to 207 kilopascals (30 pounds per square inch gauge) fed to the port 100 and the passages through the valve are, for example, 1.5 mm in diameter.

In the circuit shown in FIGS. 4A, 4B, the components are as listed in the table below:

TABLE OF COMPONENTS

| CIRCUIT REF | DESCRIPTION | TOL | MANUFACTURER/ SUPPLIER | NO OFF |
|---|---|---|---|---|
| Resistors | | | | |
| R1 | Metal Film 3.3 kOHMS 0.4 W (BS9000) | 1% | Welwyn MFR4 | 1 |
| R2 | Metal Film 270 kOHMS 0.4 W (BS9000) | " | " | 1 |
| R3 | Metal Film 470 OHMS 0.4 W (BS9000) | " | " | 2 |
| R4 | Metal Film 390 kOHMS 0.4 W (BS9000) | " | " | 1 |
| R5 | Metal Film 1 MOHM 0.4 W (BS9000) | " | " | 1 |
| R6 | Metal Film 1.2 MOHMS 0.33 W (BS9000) | 5% | Mullard VR25 | 1 |
| R7 | Metal Film 330 kOHMS 0.4 W (BS9000) | 1% | Welwyn MFR4 | 2 |
| R8 | Metal Film 560 kOHMS 0.4 W (BS9000) | " | " | 1 |
| R9 | Metal Film 5.6 kOHMS 0.4 W (BS9000) | " | " | 1 |
| R10 | Metal Film 5.1 kOHMS 0.4 W (BS9000) | " | " | 1 |
| R11 | Metal Film 100 OHMS 0.4 W (BS9000) | " | " | 2 |
| R12 | Metal Film 470 OHMS 0.4 W (BS9000) | " | " | — |
| R13 | Metal Film 100 OHMS 0.4 W (BS9000) | " | " | — |
| R14 | Metal Film 6.8 MOHMS 0.33 W (BS9000) | 5% | Mullard VR25 | 1 |
| R15 | Metal Film 1.8 MOHMS 0.33 W (BS9000) | " | " | 1 |
| R16 | Metal Film 680 kOHMS 0.4 W (BS9000) | 1% | Welwyn MFR4 | 1 |
| R17 | Metal Film 150 kOHMS 0.4 W (BS9000) | " | " | 1 |
| R18 | Metal Film 330 kOHMS 0.4 W (BS9000) | " | " | — |
| R19 | Metal Film 10 MOHMS 0.33 W (BS9000) | 5% | Mullard VR25 | 1 |
| R20 | Metal Film 220 kOHMS 0.4 W (BS9000) | 1% | Welwyn MFR4 | 1 |
| R21 | Metal Film 100 kOHMS 0.4 W (BS9000) | " | " | 1 |
| R22 | Metal Film 330 OHMS 0.4 W (BS9000) | " | " | 2 |
| R23 | Metal Film 330 OHMS 0.4 W (BS9000) | " | " | — |
| Capacitors | | | | |
| C1 | Ceramic 0.01 µF 50 V D.C. | ±20% | Mullard CW15C103M | 1 |
| C2 | Ceramic 0.047 µF 50 V D.C. | " | Mullard CW20C473M | 1 |
| C3 | Metallised Polyester 0.1 F 63 V or 100 V | ±10% | Wima MKS2 (Farnell 143-680 or (Farnell 146-902 | 3 |
| C4 | Metallised Polyester 0.1 F 63 V or 100 V | " | Wima MKS2 (Farnell 143-680 or (Farnell 146-902 | — |
| C5 | Aluminium Electrolytic 1000 µF | −10% +30% | Rifa PEG122GF4100/ Nortronic Assc Ltd Gothic Crellon Etal | 1 |
| C6 | Poly/Foil 330 pF 100 V | ±10% | Wima FKC2 | 2 |
| C7 | " | " | " | — |
| C8 | Metalised Polyester 1.0 µF 50 V | ±10% | Wima MKS2 | 1 |
| C9 | Metalised Polyester 0.1 µF 63 V or 100 V | " | " | — |
| Diodes | | | | |
| D1 | Silicon OA202 | | | 2 |
| D2 | Silicon 1N4148 | | | 2 |
| D3 | " | | | — |
| D4 | Silicon OA202 | | | |
| D5 | Light Emitting Diode, Bi Colour (Red/Green) | | IMO 5147RGW | 1 |
| D6 | Zener, BZY88C5V6, D035 | | | 4 |
| D7 | " | | | |
| D8 | " | | | — |
| D9 | " | | | — |

TABLE OF COMPONENTS -continued

| CIRCUIT REF | DESCRIPTION | TOL | MANUFACTURER/ SUPPLIER | NO OFF |
|---|---|---|---|---|
| Transistors | | | | |
| Q1 | BC214L | | | 3 |
| Q2 | BC214L | | | — |
| Q3 | BC184L | | | 2 |
| Q4 | ZTX753 | | | 2 |
| Q5 | ZTX653 | | | 2 |
| Q6 | ZTX753 | | | — |
| Q7 | BC184L | | | — |
| Q8 | ZTX653 | | | — |
| Q9 | BC214L | | | — |
| Q10 | BC109C | | | 1 |
| Q11 | BC214LC | | | 1 |
| Q12 | BC184LC | | | 1 |
| Integrated Circuits | | | | |
| IC1 | MC14001BCL | | Motorola Ceramic | 1 |
| IC2 | MC14538BCL | | Motorola Ceramic | 1 |
| IC3 | ICL8211MTY | | Intersil | 1 |
| IC4 | ICM7555IPA | | Intersil | 1 |
| Clock | | | | |
| CL20 | Clock Module Dil Package T310 EM | | AIM Instruments | 1 |
| Others | | | | |
| VR1 | Potentiometer ⅜" Cermet 50 KOHM | | Spectrol 63 Series (Farnell 63-X-50 k) | |
| B1 | Battery, Lithium SO₂ Cell, Nom Capacity 1.1 AHr | | Crompton Parkinson G06/56 | 2 |
| B2 | Battery, Lithium SO₂ Cell, Nom Capacity 1.1 AHr | | Crompton Parkinson G06/56 | — |
| KB | Membrane Keyboard | | Quillertech Job No. 0148 PCB Ref 148-6165 | 1 |
| TC1 | Resistor, 10 kOHM RGT 10 kOHM Thick Film Resistive Element Temperature Responsive | ±10% | VTM | 1 |
| SK1 | Socket, 9 Way 'D' Type | | ITT Cannon ADE9S-OL2, Lorlin DS9Y, or RS 472-764 | 1 |
| PL1 | Plug, 9 Way 'D' Type | | ITT Cannon ADE9P-OL2, Lorlin DP9Y, or RS 472-758 | 1 |
| — | Dust Cap For SK1 | | ITT Cannon DE5920 | 1 |
| SV1 | Solenoid Valve Spec. as follows: Type 40 Valve, Latching Action, normally open 6.0 V Pulse Coil, 2 Wire, 30 psig Max. WKNG. Outer Spring Material, ⌀ 0.017 M.O.V. when operated from 1000 μF Storage Capacitor to be: ≦4.0 V at 20° C. ≦5.0 V at −20° C. | | Datron Systems Inc. EEMCO Division, Los Angeles, U.S.A. Imported by Flow Components Ltd for Zoedale (Electronics) 58 Hurst Grove, Bedford. | 1 |

Figure 4A:
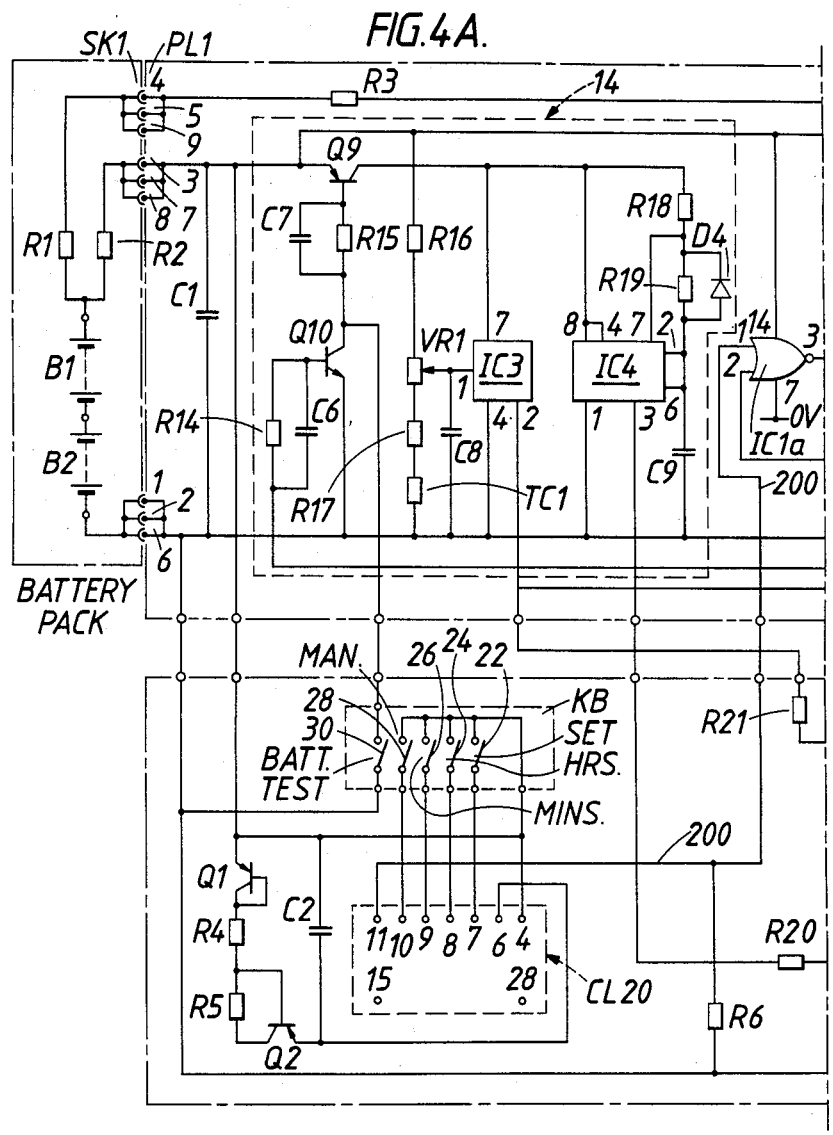
FIGS. 4A, 4B are a circuit diagram of the system shown in FIG. 1.
Figure 4B:
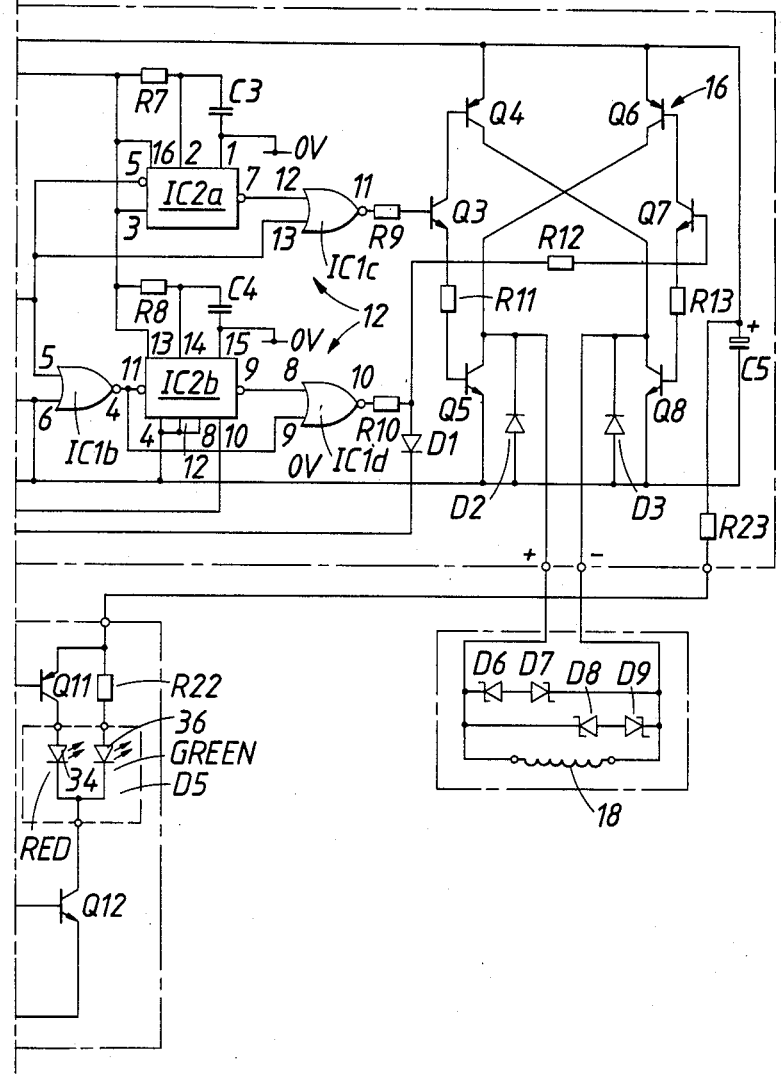

In the circuit shown in FIGS. 4A, 4B, the timer output from the timer clock 20 appears at the terminal '11' and is fed via the conductor 200 to IC1a. During each programmed 'on' period of the timer the output is 1.0 volt and during each 'off' period the output is 0.1 volt. Assuming the timer condition changes from 'on' to 'off', the output at the pin '3' of IC1a goes 'high' and the output from the pin '4' of IC1b goes 'low'. The elements IC2a remains unchanged. The element IC2b is triggered and the output at pin '9' goes 'low' for 50 milliseconds. The output at pin '10' of IC1d goes 'high' i.e. to 5 volts for 50 ms. This causes C5 to be discharged by the conduction of Q6, Q7 and Q8. The transistors Q3, Q4 and Q5 remain turned 'off'. The resultant voltage pulse through the coil 18 moves the armature 110 of the valve SV1 to the upper 'off' position shown in FIG. 2.

The connection between pin '4' of IC1b and pin '9' of IC1d is a security feature safeguarding against spurious effects caused by interference on the high impedance output line from IC1b. A sustained input on pin '11' of IC2b is necessary to ensure a sustained output at pin '10' of IC1d. A transient voltage on pin '11' of IC2b thus has no effect.

At every transition of the clock output from 'on' to 'off', the output at pin '9' of IC2b is low and at pin '10' is 'high'. This conditions turns on the battery check circuit 14. The capacitor C8 holds the battery voltage, which is compared with an internal reference voltage in IC3.

If the battery voltage is less than the reference, a switch in IC3 operates and its pin '2' is connected to pin '4'. The voltage at the negative pole of the battery is thus used to clamp the output of IC1d via D1 and the valve RV1 is prevented from changing over to the 'off' condition. In other words, the valve remains set in the 'on' position in which, as shown in FIG. 3, it transmits pressure to the regulator to keep the consumer's gas pressure at the higher demand level.

Normally, the detection of low battery voltage will occur some 2 to 4 weeks before the battery output falls to nil.

When the timer output VCO changes from 'off', 0.1 volt to 'on', 1.0 volt, the result is to cause the output at pin '11 of IC1c to go 'high' i.e. 5 volts for 30 ms. The longer pulse mentioned above of 50 ms which occurs at the timer change from 'on' to 'off' is used to prevent spurious clamping of the output from IC1d, which might otherwise be caused by the effect on IC3 of a low battery output voltage close to the critical level set by IC3. On this transition Q3, Q4 and Q5 conduct to discharge through the solenoid coil 18.

Every time the battery test key 30 is pressed the battery voltage is compared with the reference set by IC3. If the voltage is above the critical level the green l.e.d. 36 flashes through the window 32. If it is too low, the red l.e.d. 34 flashes.

If the voltage check circuit 14 automatically inhibits the valve from changing to 'off' because voltage is too low, the red l.e.d. 34 flashes. At each 'off' transition the green l.e.d. 36 flashes momentarily while the battery voltage remains above the critical level.

The system as described above with reference to the drawings is designed to be intrinsically safe. The coil 18 with the associated diodes D6, D7, D8 and D9 are encapsulated in epoxy resin and the battery pack in silicone rubber. The very small size of the system facilitates its installation in gas distribution control modules and the system gives a greatly improved level of reliability compared with the clockwork-driven timers previously used.

Figure 5:
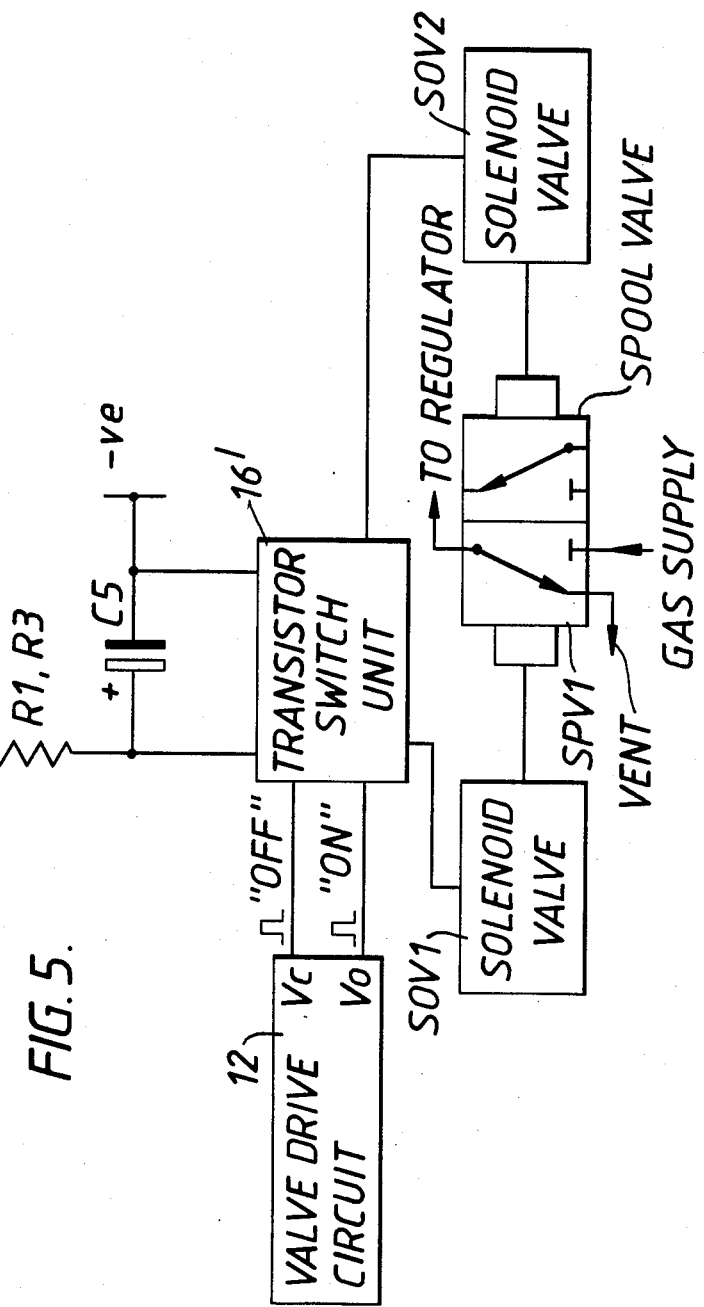
FIGS. 5 and 6 are embodiments similar to that of FIG. 2 but using different valve arrangements.
Figure 6:
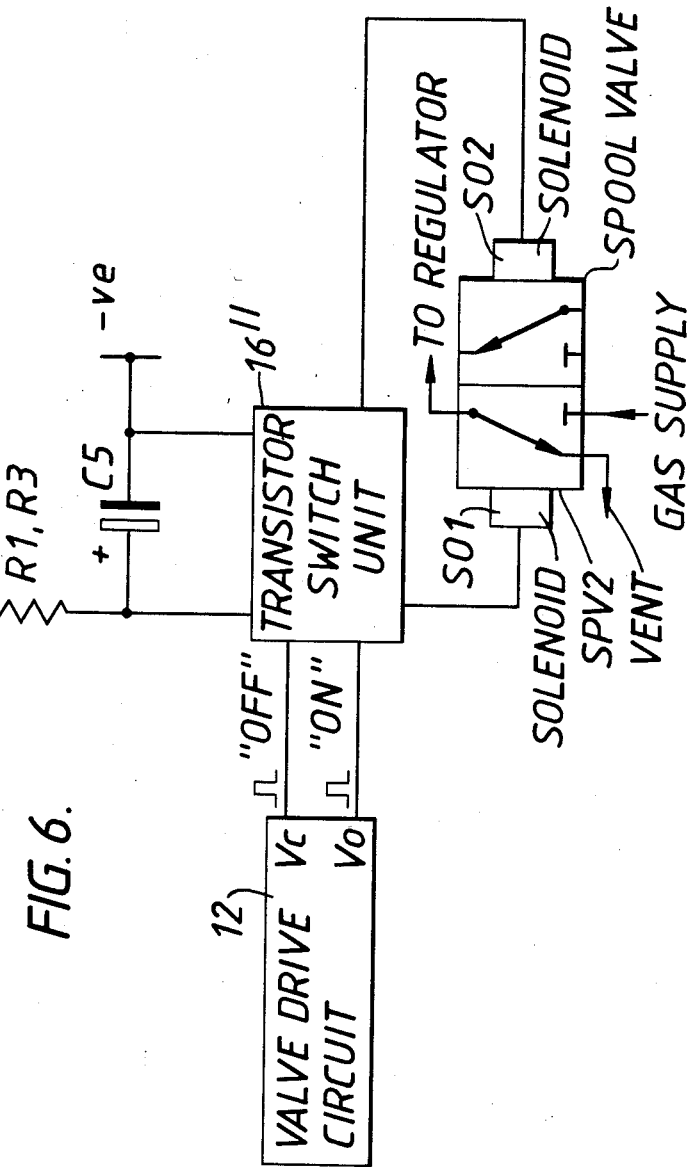

The system described above is applicable to the control of a valve for purposes other than the distribution of natural gas. The valve will handle liquids or natural gas. In modifications shown in FIGS. 5 and 6 the valve is of different type. For example, as shown in FIG. 5, the valve may be a spool valve SPV1 which is operated by fluid pressure via solenoid valves SOV1 and SOV2; or as shown in FIG. 6, the valve may be a spool valve SPV2 which is operated by two solenoids SO1 and SO2. Such modifications allow the reversing switch 16 to be dispensed with and a simple transistor switch unit 16' (FIG. 5) or 16" (FIG. 6) comprising a pair of transistor switches, one for each solenoid, to be used instead.

I claim:

1. A valve operating system comprising battery means powering said system, a bistable valve means operable by at least one solenoid, a capacitor connectable by semiconductor switch means to the solenoid to discharge through the solenoid during its 'on' periods and which is maintained charged during its 'off' periods, a drive circuit controlling the switch means by voltage pulses, a control module providing a liquid crystal display of real time and allowing selection of operating times of the valve means by manually operable elements said drive circuit deriving the pulses from the output of the module, the system excepting the solenoid during its 'off' periods being continuously powered by the battery means but the current consumption of the drive circuit during said 'off' periods being substantially zero, and said system further comprising battery voltage check circuit means for, responsive to a fall in the voltage of said battery means below a predetermined level, inhibiting the operation of said drive circuit to drive said switch means to one of its two conditions.

2. A system according to claim 1, in which the valve means comprises a single solenoid and an armature movable to move a valve member relative to valve ports.

3. A system according to claim 1, in which the valve means comprises a spool valve member movable by fluid pressure relative to valve ports under the control of solenoid valves.

4. A system according to claim 1, in which the valve means comprises a spool valve member movable relative to valve ports by two solenoids acting alternately.

5. A system according to claim 1, in which said switch means comprises reversing switch means.

6. A system according to claim 2, in which the valve member is movable between a first position in which a first valve port is connected to a second valve port and a third valve port is closed and a second position in which the second valve port is connected to the third valve port and the first valve port is closed.

7. A system according to claim 6, in which the first, second and third valve ports are connected respectively to a gas supply, a gas pressure regulator and a vent.

8. A system according to claim 1, in which said battery means comprises Lithium batteries the total voltage output of which is 6 volts.

9. A system according to claim 1, in which the drive circuit produces voltage pulses of a first duration to drive the switch means to one of two conditions and voltage pulses of a second duration to drive the switch means to the other of the two conditions.

* * * * *